US010613922B2

(12) United States Patent
Mane et al.

(10) Patent No.: US 10,613,922 B2
(45) Date of Patent: Apr. 7, 2020

(54) SYNCHRONOUSLY GENERATING DIAGNOSTIC DATA

(71) Applicant: INTERNATIONAL BUSINESS MACHINES CORPORATION, Armonk, NY (US)

(72) Inventors: Amit Mane, Bangalore (IN); Dinakar Guniguntala, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/848,798

(22) Filed: Dec. 20, 2017

(65) Prior Publication Data

US 2019/0188068 A1 Jun. 20, 2019

(51) Int. Cl.
*G06F 11/00* (2006.01)
*G06F 11/07* (2006.01)
*H04L 12/24* (2006.01)

(52) U.S. Cl.
CPC ........ *G06F 11/079* (2013.01); *G06F 11/0709* (2013.01); *G06F 11/0778* (2013.01); *H04L 41/0645* (2013.01); *H04L 41/064* (2013.01)

(58) Field of Classification Search
CPC ............... G06F 11/0778; G06F 11/079; G06F 11/0709; G06F 11/3006; G06F 11/362; G06F 11/3636
See application file for complete search history.

(56) References Cited

U.S. PATENT DOCUMENTS

| 6,857,084 B1* | 2/2005 | Giles ................... G06F 11/3648 714/35 |
| 2007/0006165 A1* | 1/2007 | Lam ..................... G06F 11/3471 717/128 |
| 2015/0113130 A1* | 4/2015 | Chambliss .............. H04L 43/10 709/224 |

(Continued)

FOREIGN PATENT DOCUMENTS

WO 2017078662 5/2017

OTHER PUBLICATIONS

Garcia-Molina et al., "Debugging a Distributed Computing System", Mar. 1984, IEEE Transactions on Software Engineering, vol. SE-10, No. 2, Mar. 1984, pp. 210-219 (Year: 1984).*

(Continued)

*Primary Examiner* — Michael Maskulinski
(74) *Attorney, Agent, or Firm* — Schmeiser, Olsen & Watts; Mark C. Vallone

(57) ABSTRACT

An approach is provided for generating diagnostic data. In response to a determination that an error condition occurs in a first node executing a first process which restarts based on the error condition occurring, a first message is received, where the first message is broadcast from the first node to a second node and other node(s). In response to the first message, in-memory collections of diagnostic data are started in the nodes. Subsequent to receiving the first message, the error condition occurs in the second node. Based on the error condition occurring in the second node, a second message is broadcast from the second node to the first node and the other node(s) which causes the first node, the second node, and the other node(s) to dump the in-memory collections of diagnostic data at a predefined location.

19 Claims, 6 Drawing Sheets

(56) References Cited

U.S. PATENT DOCUMENTS

2015/0121145 A1\* 4/2015 Mahajan ............... G06F 11/079
 714/37
2016/0012200 A1 1/2016 Malinowski et al.
2016/0147653 A1\* 5/2016 Accapadi ............ G06F 11/3636
 711/154
2016/0357624 A1\* 12/2016 Hashimoto ......... G06F 11/0778

OTHER PUBLICATIONS

Francalanza et al., "Runtime Monitoring of Distributed Systems", 2010 (Year: 2010).\*

\* cited by examiner

US 10,613,922 B2

SYNCHRONOUSLY GENERATING DIAGNOSTIC DATA

BACKGROUND

The present invention relates to software diagnostics, and more particularly to generating diagnostic data in a distributed software environment.

Usually in a client-server environment and in a distributed software environment, applications run as different processes on different machines. Software issues or bugs resulting from an interaction between some of the aforementioned applications need diagnostic data from all the machines involved in the interaction. If the software issues are intermittent, diagnosing the issues poses a major challenge for software engineers, especially due to the distributed nature of the environment. In a client-server application running in two different virtual machines hosted on two different physical machines, an intermittent software issue may appear after an application runs for an extensive period of time. This period may span over many days or weeks.

A programming bug that causes a software issue may reside on either side of a client-server program. Erroneous data representation over the network and protocol rule violations are common sources of such software issues. For example, in an attempt to create a very large array using a remote request sent from a client to a server, an out of memory error can result if a length of the array is misread at the receiving end of the request, or if the size or length is written incorrectly in the network stream while sending the request and the incorrectly written length is a huge number. In this case, since the programming bug could reside on either side of the client-server environment, diagnostic data from only the failing end does not provide clear and complete diagnostic information about the programming bug.

In cases of cloud based solutions, micro services, and grid based software, where multiple individual software entities written using different programming languages and for different runtime environments, and running on different operating systems and interacting based on diverse protocol rules, highly intermittent software issues are challenging to debug, analyze, and eventually resolve.

Known diagnostic techniques include enabling diagnostics on all virtual machines involved for an entire lifespan of an application until an intermittent software issue occurs. These techniques are impractical because they cause performance degradation and generate extremely large amounts of diagnostic data generated over days or weeks. Generating the large amount of diagnostic data may result in running out of space used to store the diagnostic data or overwriting earlier diagnostic data.

Other known diagnostic techniques take process snapshots such as system dumps when a software issue occurs. The process snapshot is specific to a particular virtual or physical machine and does not provide information about what was happening on another virtual or physical machine which is involved in the application when the issue occurs. The process snapshot provides information about the state of various attributes at a specific point when the issue occurred but does not include any historical information leading up to the time the issue occurred. In a client-server environment, scenarios leading to a software issue build up over a period of time and a process snapshot is not able to capture information related to that period of time, instead capturing a static view about a virtual or physical machine only at a specific time at which the issue occurs.

SUMMARY

In one embodiment, the present invention provides a method of generating diagnostic data. The method includes a computer receiving a first message broadcast from a first node to a second node and one or more other nodes. Receiving the first message is in response to a determination that an error condition occurs in the first node executing a first process which restarts based on the occurrence of the error condition. The second node includes the computer. The first and second nodes and the one or more other nodes are included in a distributed computing system which executes multiple processes. The method further includes the computer starting an in-memory collection of diagnostic data in the second node in response to receiving the first message. Other in-memory collections of diagnostic data are started in the first node and the one or more other nodes in response to the first message being broadcast from the first node. The method further includes subsequent to the step of receiving the first message, the computer determining that the error condition occurs in the second node. The method further includes based on the error condition occurring in the second node, the computer broadcasting a second message to the first node and the one or more other nodes, which causes the first node, the second node, and the one or more other nodes to perform a dump of the in-memory collection of diagnostic data and the other in-memory collections of other diagnostic data at a predefined location.

In another embodiment, the present invention provides a computer program product for generating diagnostic data. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system receiving a first message broadcast from a first node to a second node and one or more other nodes. Receiving the first message is in response to a determination that an error condition occurs in the first node executing a first process which restarts based on the occurrence of the error condition. The second node includes the computer system. The first and second nodes and the one or more other nodes are included in a distributed computing system which executes multiple processes. The method further includes the computer system starting an in-memory collection of diagnostic data in the second node in response to receiving the first message. Other in-memory collections of other diagnostic data are started in the first node and the one or more other nodes in response to the first message being broadcast from the first node. The method further includes subsequent to the step of receiving the first message, the computer system determining that the error condition occurs in the second node. The method further includes based on the error condition occurring in the second node, the computer system broadcasting a second message to the first node and the one or more other nodes, which causes the first node, the second node, and the one or more other nodes to perform a dump of the in-memory collection of diagnostic data and the other in-memory collection of diagnostic data at a predefined location.

In another embodiment, the present invention provides a method of generating diagnostic data. The method includes a first computer initiating a diagnostics feature for a first process running on the first computer. The first process communicates over a computer network with a second process running on a second computer. The diagnostics feature is initiated for the second process. The first and second computers are in a client-server computing environment. The method further includes in response to the step of initiating the diagnostics feature, the first computer storing first diagnostic data for the first process in a first memory of the first computer. Second diagnostic data for the second process is stored in a second memory of the second computer. The method further includes the first computer determining whether an event occurred. The event indicates an error condition in the first process. The method further includes prior to the first process shutting down in response to the error condition and if the event occurred, the first computer sending a message to the second process notifying the second process about the event and storing the first diagnostic data in a first log file. The second diagnostic data is stored in a second log file by the second computer in response to a receipt of the message by the second process. The method further includes if the event did not occur, the first computer determining whether the first diagnostic data in the first memory exceeds a limit. The first computer discards an oldest record of the first diagnostic data stored in the first memory in response to the first diagnostic data exceeding the limit.

Embodiments of the present invention precisely generate relevant diagnostic data while avoiding a generation of irrelevant diagnostic data, even if the application runs for days or weeks before failing. Embodiments of the present invention generate diagnostic data from both ends synchronously in a client-server or distributed software environment to provide clear information about what is happening on both ends at the time that the software issue occurs and in the time period that immediately preceded the time that the software issue occurs. Embodiments of the present invention substantially reduce the performance degradation that usually occurs with known diagnostic solutions. Furthermore, the amount and kind of diagnostic data that is generated can be preconfigured.

DETAILED DESCRIPTION

Overview

Embodiments of the present invention generate precise and complete software diagnostic data in a synchronized manner on multiple computing nodes or software entities communicating with each other at a time an issue (i.e., error condition) occurs. The software entities may be components of a two-tier or three-tier client-server environment, a cloud-based solution, a grid/cluster based distributed software solution, or a micro services based software solution.

Known diagnostic data generation techniques that generate diagnostics for a lifecycle of an application to identify an intermittent error condition in a client-server or distributed software environment create a substantial amount of diagnostic data which leads to running out of storage space for the diagnostic data or overwriting earlier diagnostic data. Other known diagnostic data generation techniques provide process snapshots of diagnostic data at a time of an error condition, where the data is specific to a particular machine or virtual machine, while failing to provide diagnostic data regarding events that occurred on other machines or other virtual machines at the time of the error condition. The snapshot provides information about the state of various attributes at the time of the error condition, but does not include historical information in the time period immediately preceding the time of the error condition. The aforementioned limitations of the known techniques provide a unique challenge that is overcome by embodiments of the present invention, which minimizes or avoids performance degradation while generating (i) relevant diagnostic data even if the application runs for days or weeks before failing due to an intermittent issue, without generating irrelevant diagnostic data and (ii) synchronized diagnostic data which describes events that happened at the time of the issue and in a time period immediately preceding the issue, where the events happened on a client and a server in a client-server environment or on different nodes in a distributed software environment.

System for Generating Diagnostic Data

Figure 1:
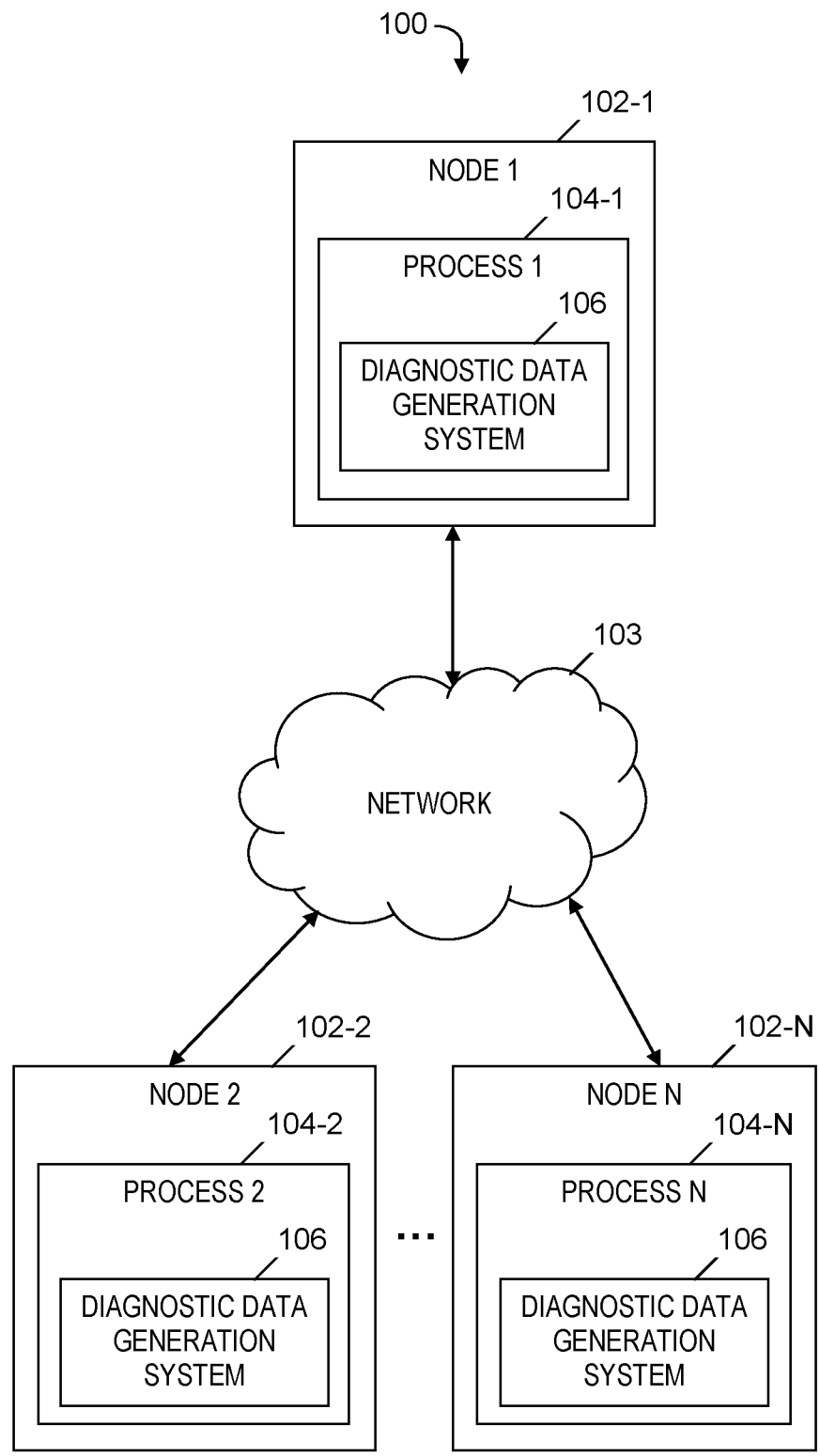
FIG. 1 is a block diagram of a system for generating diagnostic data, in accordance with embodiments of the present invention.

FIG. 1 is a block diagram of a system 100 for generating diagnostic data, in accordance with embodiments of the present invention. System 100 includes node 102-1, node 102-2, . . . , 102-N, which communicate with each other via a computer network 103, where N is an integer greater than or equal to two. System 100 may be a distributed computing system or a client-server system. In one embodiment, nodes 102-1, 102-2, . . . , 102-N are computers.

Node 102-1, node 102-2, . . . , and node 102-N execute process 104-1, process 104-2, . . . , 104-N, respectively, which are software processes. Each of nodes 102-1, 102-2, . . . , 102-N execute a software-based diagnostic data generation system 106 and include corresponding memory (not shown) and central processing units (not shown). In one embodiment, diagnostic data generation system 106 is a module that is part of the runtime itself, and is loaded when the language runtime is initiated. One or more other processes (not shown) may be executed in node 102-1, node 102-2, . . . , or 102-N.

Diagnostic data generation system 106 in node 102-1 detects an intermittent error condition in process 104-1 and broadcasts a signal or message to the other node(s) (i.e., node 102-2, . . . , 102-N) to perform in-memory tracing by process 104-2, . . . , process 104-N, which stores tracing diagnostic data in the respective memories (not shown) of node 102-2, . . . , node 102-N. Process 104-1 also performs in-memory tracing which stores diagnostic data in the memory (not shown) in node 102-1. Diagnostic data generation system 106 in node 102-2 detects a re-occurrence of the same intermittent error condition, which occurs in process 104-2. Diagnostic data generation system 106 in node 102-2 broadcasts a second signal or message to node 102-1 and any other node in system 100, which causes the nodes 102-1, 102-2, . . . , 102-N to dump the diagnostic data collected in the aforementioned in-memory tracing into a predefined location of a data repository (not shown).

In one embodiment, system 100 is a distributed computing system in which multiple processes (i.e., processes 104-1, 104-2, . . . , 104-N) are running on multiple different nodes (i.e., nodes 102-1, node 102-2, . . . , 102-N), where the processes are written in different languages and are running on different operating systems in different runtime environments. The distributed computing system may be hosted in a cloud and may provide micro services. The topology of the distributed computing system 100 may be (i) a single cluster; (ii) configured across multiple clusters; (iii) hosted on a single cloud or across multiple different clouds; (iv) hosted on a hybrid cloud; or (v) a combination of the aforementioned items (i) through (iv). In the distributed computing system, processes 104-1, 104-2, . . . , 104-N communicate with each other to exchange messages, notifications, and data. The exchange is based on a communication protocol or multiple different communication protocols. An intermittent issue occurring on a single process in the distributed computing system is a challenge to analyze, debug, and rectify using known diagnostic data techniques. The intermittent issue may not occur on the same node each time it re-occurs. Even though the issue occurs and re-occurs in processes on different nodes intermittently, the root cause of the issue may be due to a communication protocol rule violation by another process or other processes running on node(s) which are different from the node in which the issue was detected. In this case, the determination of the root cause necessitates diagnostic data being collected from every node in system 100.

In one embodiment, system 100 is a client-server system which includes node 102-1 and node 102-2. Node 102-1 enables a diagnostic feature provided by diagnostic data generation system 106 running in node 102-1 and node 102-2 enables a diagnostic feature provided by diagnostic data generation system 106 running in node 102-2. Process 104-1 and process 104-2 collect and store tracing data in respective memories of node 102-1 and node 102-2. Diagnostic data generation system 106 in node 102-1 determines whether an event occurs in process 104-1, where the event indicates an error condition. Responsive to determining that the event occurs, diagnostic data generation system 106 in node 102-1 sends a message about the event to process 104-2 so that process 104-1 and 104-2 write synchronized tracing data from the respective memories to a log file (not shown) and generate synchronized system dumps for node 102-1 and node 102-2.

Figure 2:
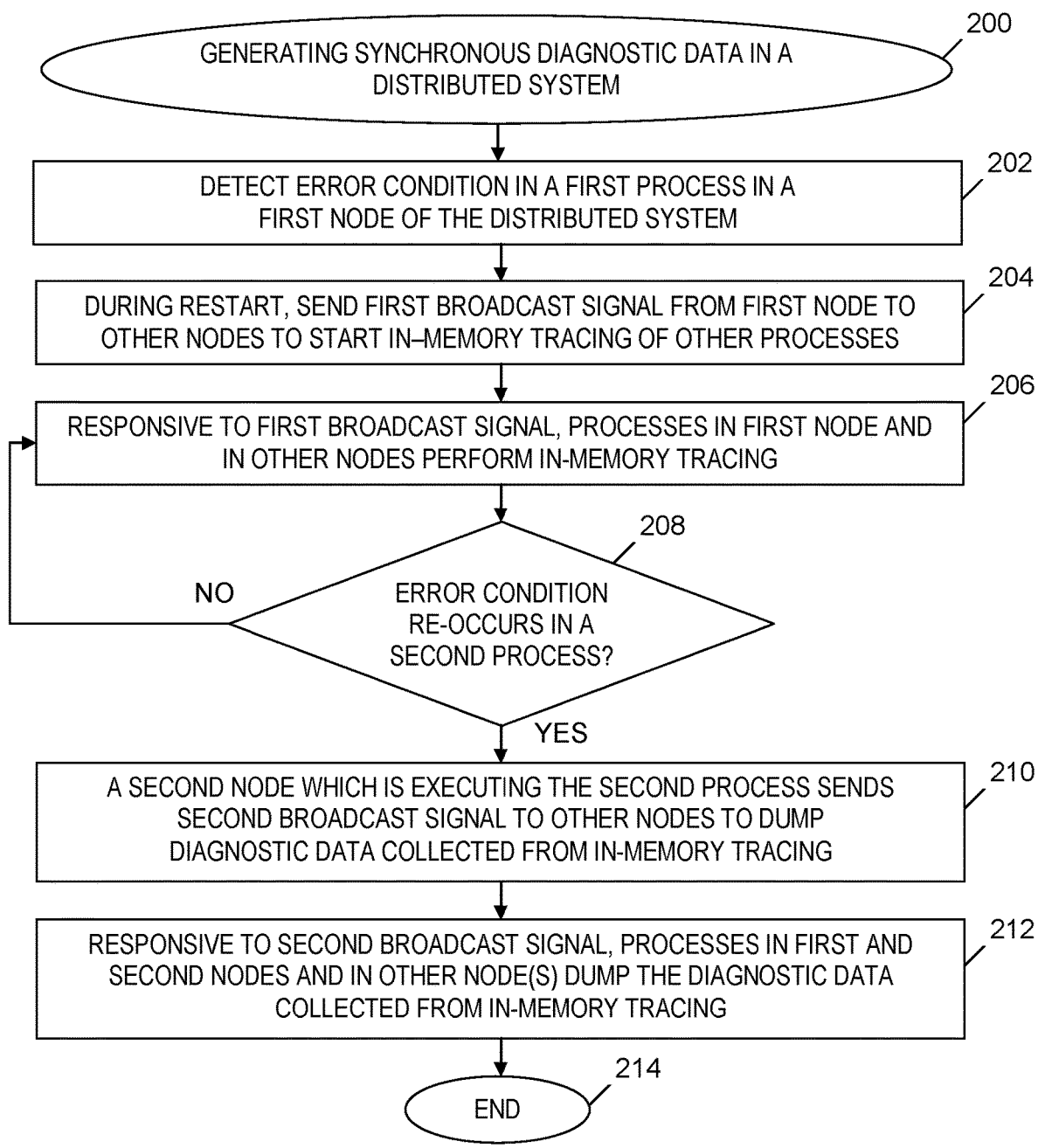
FIG. 2 is a flowchart of a process of generating synchronous diagnostic data in a distributed computing system, in accordance with embodiments of the present invention.
Figure 3:
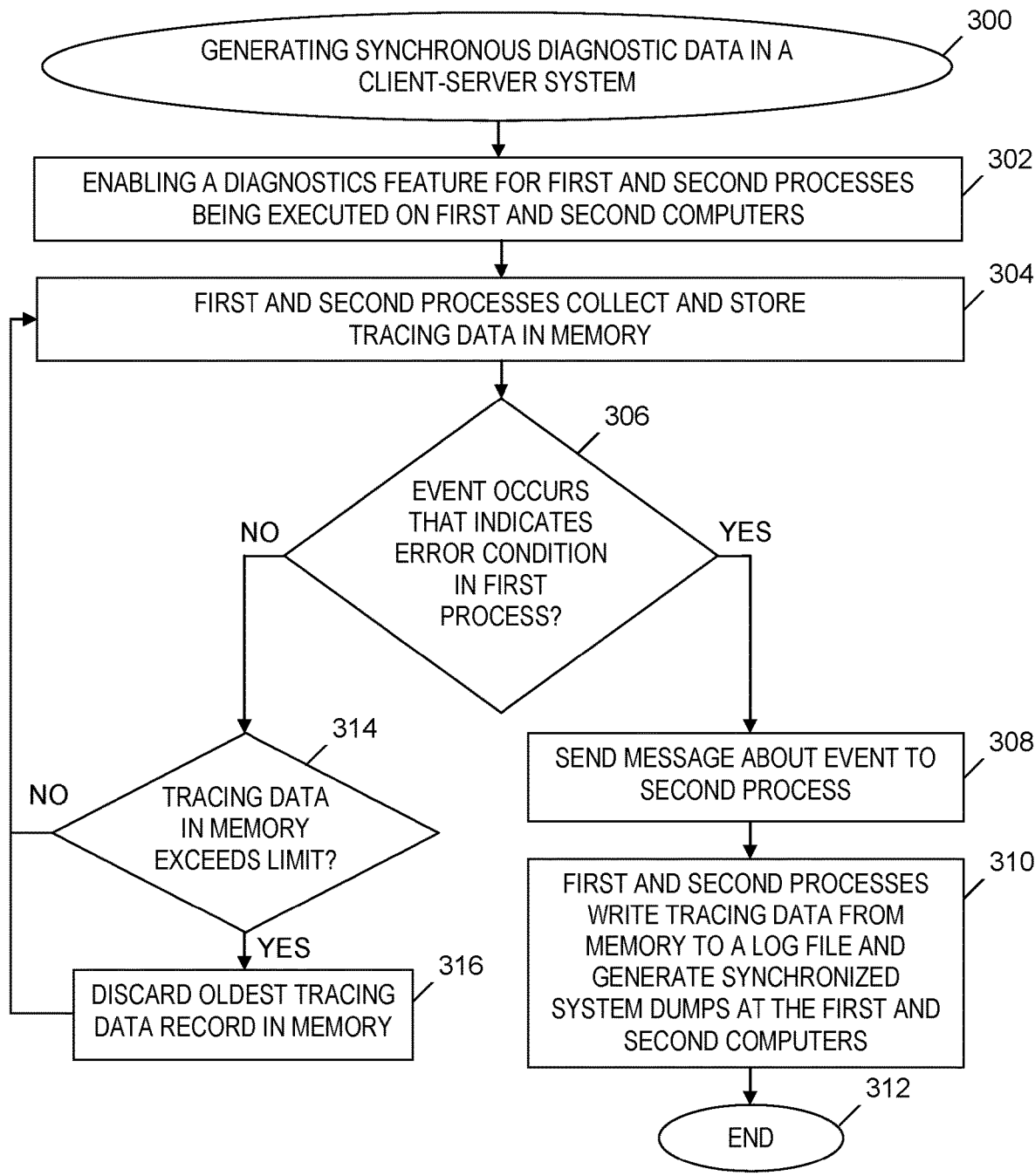
FIG. 3 is a flowchart of a process of generating synchronous diagnostic data in a client-server system, in accordance with embodiments of the present invention.
Figure 4:
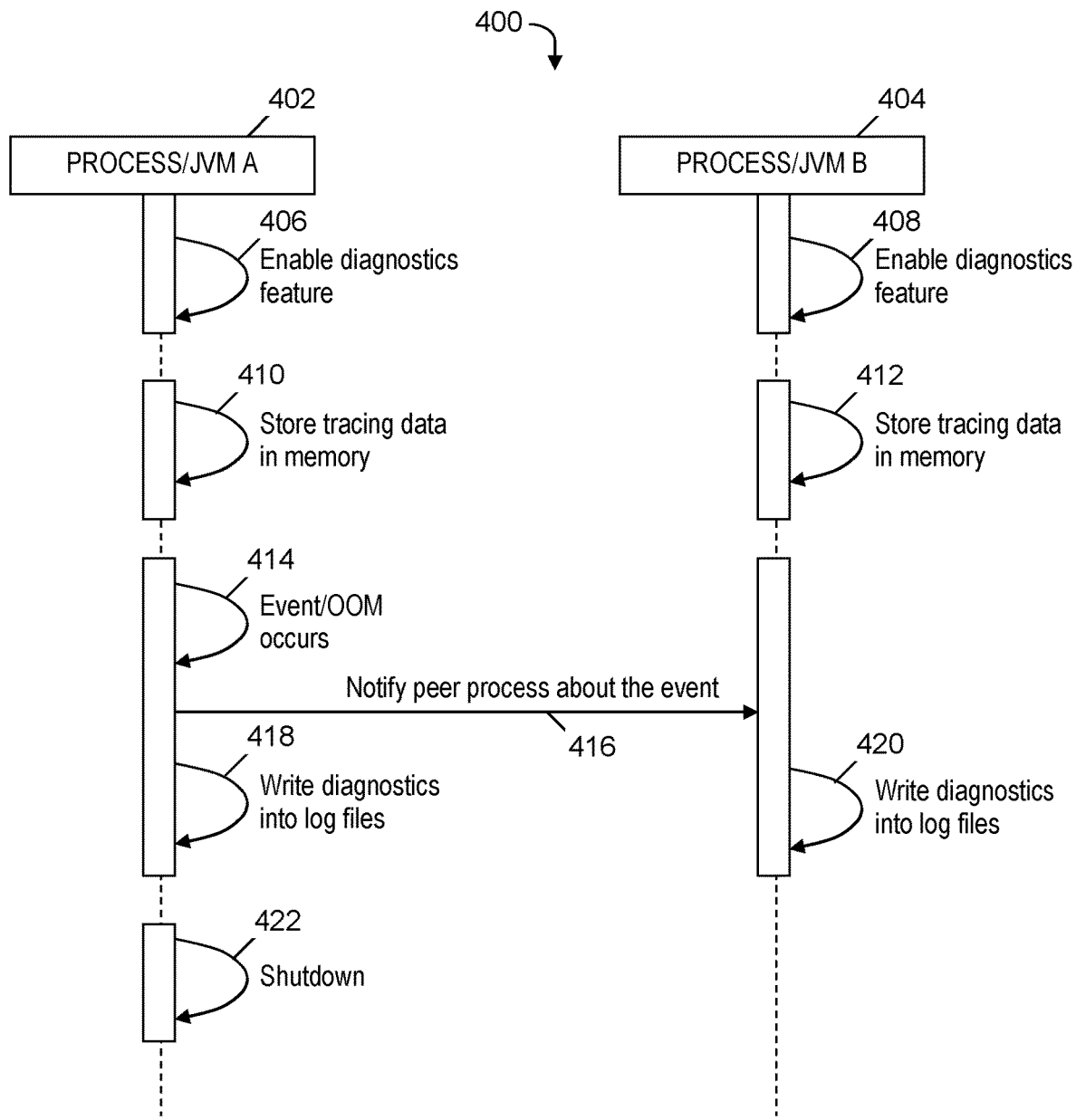
FIG. 4 is an example of steps occurring in the process of FIG. 3, in accordance with embodiments of the present invention.

The functionality of the components shown in FIG. 1 is described in more detail in the discussion of FIG. 2, FIG. 3, and FIG. 4 presented below.

Process for Generating Diagnostic Data

FIG. 2 is a flowchart of a process of generating synchronous diagnostic data in a distributed computing system, in accordance with embodiments of the present invention. The process of FIG. 2 starts at step 200. In step 202, diagnostic data generation system 106 (see FIG. 1) in node 102-1 (see FIG. 1) detects an error condition in process 104-1 (see FIG. 1), which initiates a shutdown and restart of process 104-1 (see FIG. 1).

In step 204, during the restart of process 104-1 (see FIG. 1), diagnostic data generation system 106 (see FIG. 1) sends a first broadcast signal from node 102-1 (see FIG. 1) to nodes 102-2, . . . , 102-N (see FIG. 1) to initiate in-memory tracing by processes 104-2, . . . , 104-N (see FIG. 1).

In step 206, in response to the first broadcast signal sent in step 204, processes 104-1, 104-2, . . . , 104-N (see FIG. 1) perform in-memory tracing.

In step 208, diagnostic data generation system 106 (see FIG. 1) in node 102-2 (see FIG. 1) determines whether the same error condition detected in step 202 re-occurs in process 104-2 (see FIG. 1). If diagnostic data generation system 106 (see FIG. 1) determines in step 208 that the aforementioned error condition does not occur, then the No branch of step 208 is taken and the process of FIG. 2 loops back to step 206 by which processes 104-1, 104-2, . . . , 104-N (see FIG. 1) continue performing in-memory tracing.

If diagnostic data generation system 106 (see FIG. 1) determines in step 208 that the error condition previously detected in step 202 re-occurs in process 104-2, then the Yes branch of step 208 is taken and step 210 is performed.

In step 210, diagnostic data generation system 106 (see FIG. 1) in node 102-2 (see FIG. 1) sends a second broadcast signal to the other nodes in system 100 to dump the diagnostic data collected by the in-memory tracing performed in step 206.

In step 212, in response to the second broadcast signal sent in step 210, process 104-1, 104-2, . . . , 104-N (see FIG. 1) dumps the diagnostic data in a predefined location in a data repository, where the diagnostic data was collected by the in-memory tracing performed in step 206. The process of FIG. 2 ends at step 214.

FIG. 3 is a flowchart of a process of generating synchronous diagnostic data in a client-server system, in accordance with embodiments of the present invention. The process of FIG. 3 starts at step 300. In step 302, node 102-1 (see FIG. 1) (i.e., a first computer) enables a diagnostic feature provided by diagnostic data generation system 106 (see FIG. 1) in node 102-1 (see FIG. 1) and node 102-2 (i.e., a second computer) enables a diagnostic feature provided by diagnostic data generation system 106 (see FIG. 1) in node 102-2 (see FIG. 1).

In step 304, in response to the diagnostic features being enabled in step 302, processes 104-1 and 104-2 (see FIG. 1) collect and store tracing data in a first memory and a second memory, which reside in the first and second computers, respectively.

In step 306, diagnostic data generation system 106 (see FIG. 1) in the first computer determines whether an event occurs in the first computer that indicates an error condition in process 104-1 (see FIG. 1). If diagnostic data generation system 106 (see FIG. 1) determines in step 306 that the event does occur, then the Yes branch of step 306 is taken and step 308 is performed.

In step 308, diagnostic data generation system 106 (see FIG. 1) in the first computer sends a message about the event to process 104-2 (see FIG. 1).

In step 310, in response to the message sent in step 308, diagnostic data generation system 106 (see FIG. 1) in the first computer writes first tracing data from the memory of the first computer to a log file and diagnostic data generation system 106 (see FIG. 1) in the second computer writes second tracing data from the memory of the second computer into the log file, so that the first and second tracing data include diagnostic data in a synchronized time period that precedes a time at which the event occurred. Step 310 also includes diagnostic data generation system 106 (see FIG. 1) in the first and second computers generating synchronized system dumps for the first and second computers. The process of FIG. 3 ends at step 312.

Returning to step 306, if diagnostic data generation system 106 (see FIG. 1) in the first computer determines that the event has not yet occurred, then the No branch of step 306 is taken and step 314 is performed.

In step 314, diagnostic data generation system 106 (see FIG. 1) in the first computer determines whether the tracing data stored in memory of the first computer exceeds a limit for tracing data storage, which may be predefined or provided by a user prior to step 314. If the limit is exceeded, then the Yes branch of step 314 is taken and in step 316, diagnostic data generation system 106 (see FIG. 1) in the first computer discards the oldest tracing data record in the memory of the first computer. After step 316, the process of FIG. 3 loops back to step 304 in which the processes continue to collect and store tracing data.

Returning to step 314, if diagnostic data generation system 106 (see FIG. 1) in the first computer determines that the limit in step 314 is not exceeded, then the No branch of step 314 is taken and the process of FIG. 3 loops back to step 304 in which the processes continue to collect and store tracing data in memory.

The aforementioned steps 314 and 316 are similarly performed by diagnostic data generation system 106 (see FIG. 1) in the second computer so that the tracing data stored in the memory of the second computer is checked against the limit in step 314 and if the limit is exceeded, diagnostic data generation system 106 (see FIG. 1) discards the oldest tracing data record in the memory of the second computer in step 316.

EXAMPLES

FIG. 4 is an example 400 of steps occurring in the process of FIG. 3, in accordance with embodiments of the present invention. Example 400 depicts an example of a client server application which includes a first process 402 running on a first Java® virtual machine (JVM®) and a second process 404 running on a second JVM®. Java and JVM are registered trademarks of Oracle America, Inc., located in Redwood Shores, Calif. Communication between process 402 and process 404 uses the Common Object Request Broker Architecture (CORBA) standard. In a client server application, three categories of diagnostic data from both ends are used to identify the root cause of an error condition: (1) debug tracing which provides information about the execution path; (2) network data logs which provide information about the data exchanged between two processes over a network; and (3) various dumps at the time of failure which provides a snapshot of various attributes. In example 400, processes 402 and 404 store in respective memories the debug tracing information and the information in the network data logs. The maximum amount of data to be held in memory depends on preconfigured attributes. If the data in memory exceeds the maximum amount, the oldest data is discarded to make space for new tracing data by a Least Recently Used (LRU) caching mechanism.

In example 400, process 402 is communicating with process 404 via a computer network (not shown). In step 406, process 402 enables a diagnostics feature provided by diagnostic data generation system 106 (see FIG. 1). In step 408, process 404 enables a diagnostics feature provided by diagnostic data generation system 106 (see FIG. 1). Steps 406 and 408 are examples of step 302 in FIG. 3.

In step 410, process 402 stores the tracing data (i.e., the debug tracing information and the information in the network data logs) in the memory of the computer on which process 402 is being executed. In step 412, process 404 stores the tracing data (i.e., the debug tracing information and the information in the network data logs) in the memory of the computer on which process 404 is being executed. Steps 410 and 412 are examples of step 304 in FIG. 3.

In step 414, an event occurs in process 402 that causes an out of memory (OOM) error in process 402. Step 414 is an example of step 306 in FIG. 3.

In step 416, responsive to the OOM error occurring in process 402 and prior to process 402 shutting down as a result of the OOM error, process 402 notifies its peer process (i.e., process 404) about the event that caused the OOM error. Step 416 is an example of step 308 in FIG. 3.

In step 418, prior to process 402 shutting down as a result of the OOM error, process 402 writes the diagnostics stored in its associated memory (i.e., the debug tracing information and the information in the network data logs) into log files. In step 420, responsive to receiving the notification from process 402 about the event that caused the OOM error, process 404 writes the diagnostics present in its associated memory (i.e., the debug tracing information and the information in the network data logs) into log files. Step 418 also includes process 402 generating a system dump for the first JVM® on which process 402 is running and step 420 includes process 404 generating a system dump for the second JVM® on which process 404 is running. The two system dumps are generated to be in sync with each other. Steps 418 and 420 are examples of step 310 in FIG. 3.

In step 422, process 402 shuts down in response to the OOM error condition.

Figure 5:
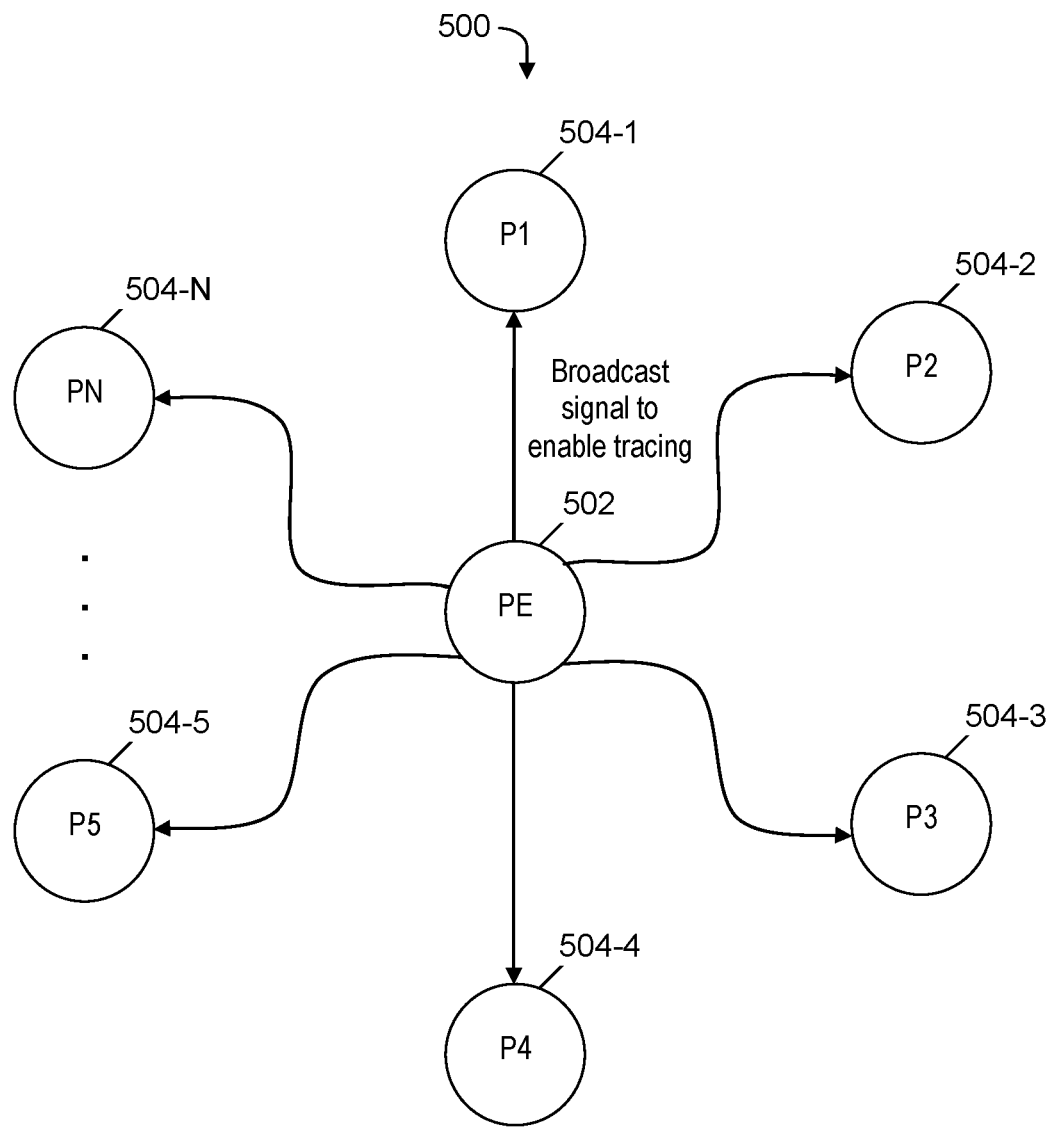
FIG. 5 is an example of broadcasting a signal to notify processes to enable tracing in the process of FIG. 2, in accordance with embodiments of the present invention.

FIG. 5 is an example 500 of broadcasting a signal to notify processes to enable tracing in the process of FIG. 2, in accordance with embodiments of the present invention. Example 500 is an implementation of a portion of the process of FIG. 2 in a large distributed software system. One process (i.e., process 502) of multiple processes experiences a highly intermittent error condition and undergoes a restart in response to the error condition. During the restart, process 502 sends out a broadcast message or signal to other processes 504-1, 504-2, 504-3, 504-4, 504-5, . . . , 504-N to start in-memory tracing, where N is an integer greater than or equal to five. The present invention contemplates other examples similar to example 500 in which N is an integer greater than or equal to one.

The broadcast signal informs the processes 504-1, 504-2, 504-3, 504-4, 504-5, . . . , 504-N about the maximum amount of diagnostic data that is to be held in memory. Alternatively, the maximum amount of diagnostic data may be predefined and the broadcast signal does not indicate the maximum amount explicitly.

After receiving the broadcast signal, processes 504-1, 504-2, 504-3, 504-4, 504-5, . . . , 504-N and process 502 start in-memory log collection. At this point, example 500 expects that the intermittent error condition will occur in the near future (i.e., before a substantial amount of time passes). The subsequent occurrences of the intermittent error condition can be in any process included in processes 504-1, 504-2, 504-3, 504-4, 504-5, . . . , 504-N or process 502.

After an amount of time passes, the error condition re-occurs in process Pi, where Pi may be process 502, process 504-1, process 504-2, process 504-3, process 504-4, process 504-5, . . . , or process 504-N. In response to the error condition re-occurring in process Pi, sends a broadcast signal to all the other aforementioned processes to dump the diagnostic data previously collected in their respective memories at a predefined location specified by a predefined path. Process Pi also dumps its collected diagnostic data at the predefined location. In one embodiment, the broadcast signal to dump the diagnostic data may also result in the aforementioned processes running preconfigured health check data collection tools.

Computer System

Figure 6:
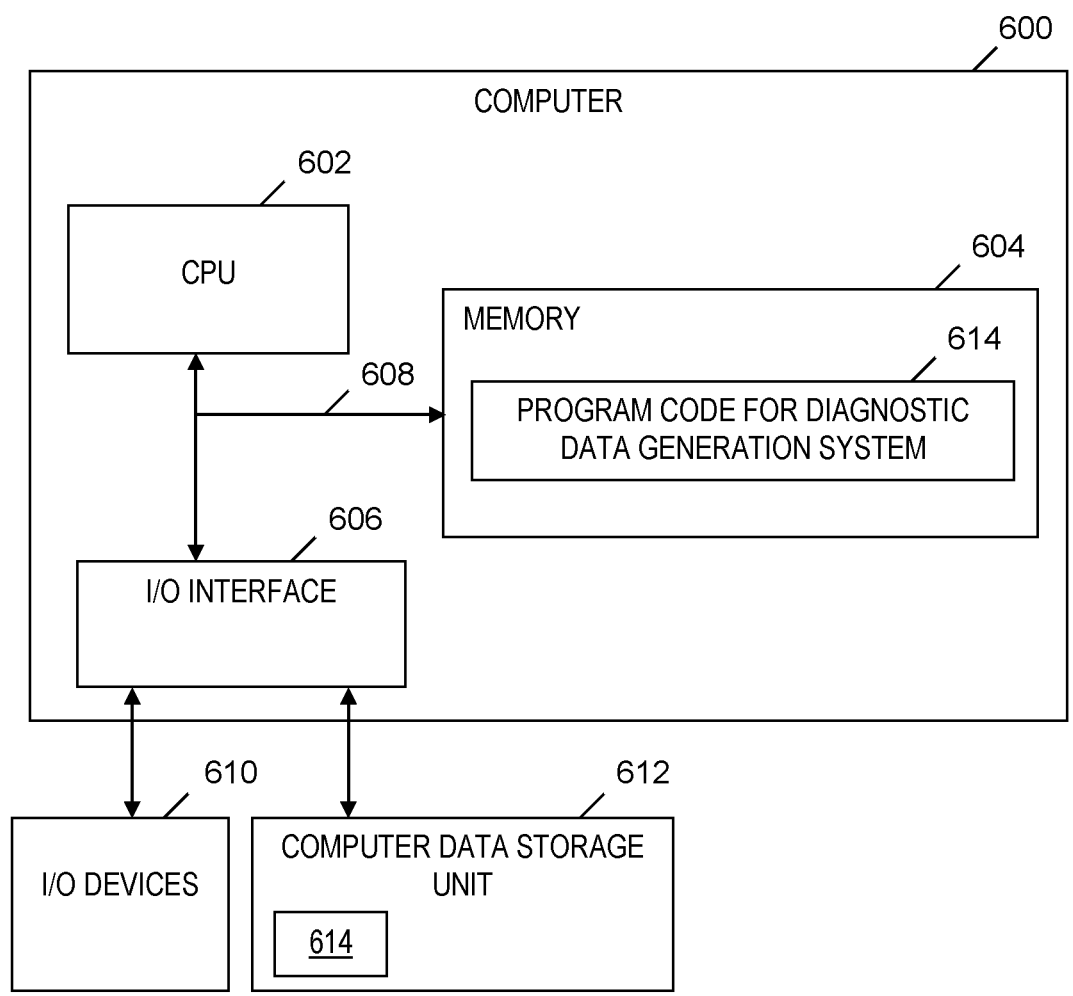
FIG. 6 is a block diagram of a computer included in the system of FIG. 1 and that implements the process of FIG. 2 or FIG. 3, in accordance with embodiments of the present invention.

FIG. 6 is a block diagram of a computer 600 that is included in the system of FIG. 1 and implements the process of FIG. 2 or FIG. 3, in accordance with embodiments of the present invention. In one embodiment, computer 600 is node 102-1 (see FIG. 1) and other computers whose structure and functionality are similar to the structure and functionality of computer 600 are the other nodes in system 100 (see FIG. 1). In another embodiment, computer 600 is node 102-2 (see FIG. 1). In other embodiments, the nodes in system 100 (see FIG. 1) include computer 600. Computer 600 is a computer system that generally includes a central processing unit (CPU) 602, a memory 604, an input/output (I/O) interface 606, and a bus 608. Further, computer 600 is coupled to I/O devices 610 and a computer data storage unit 612. CPU 602 performs computation and control functions of computer 600, including executing instructions included in program code 614 for diagnostic data generation system 106 (see FIG. 1) to perform a method of generating diagnostic data, where the instructions are executed by CPU 602 via memory 604. CPU 602 may include a single processing unit, or be distributed across one or more processing units in one or more locations (e.g., on a client and server).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems in various forms. Further, memory 604 can include data distributed across, for example, a local area network (LAN) or a wide area network (WAN).

I/O interface 606 includes any system for exchanging information to or from an external source. I/O devices 610 include any known type of external device, including a display, keyboard, etc. Bus 608 provides a communication link between each of the components in computer 600, and may include any type of transmission link, including electrical, optical, wireless, etc.

I/O interface 606 also allows computer 600 to store information (e.g., data or program instructions such as program code 614) on and retrieve the information from computer data storage unit 612 or another computer data storage unit (not shown). Computer data storage unit 612 includes a known computer-readable storage medium, which is described below. In one embodiment, computer data storage unit 612 is a non-volatile data storage device, such as a magnetic disk drive (i.e., hard disk drive) or an optical disc drive (e.g., a CD-ROM drive which receives a CD-ROM disk).

Memory 604 and/or storage unit 612 may store computer program code 614 that includes instructions that are executed by CPU 602 via memory 604 to generate diagnostic data. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

Storage unit 612 and/or one or more other computer data storage units (not shown) that are coupled to computer 600 may include diagnostic data including system dumps which are generated by diagnostic data generation system 106 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to generating diagnostic data. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 600) including one or more processors (e.g., CPU 602), wherein the processor(s) carry out instructions contained in the code causing the computer system to generate diagnostic data. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of generating diagnostic data.

While it is understood that program code 614 for generating diagnostic data may be deployed by manually loading directly in client, server and proxy computers (not shown) via loading a computer-readable storage medium (e.g., computer data storage unit 612), program code 614 may also be automatically or semi-automatically deployed into computer 600 by sending program code 614 to a central server or a group of central servers. Program code 614 is then downloaded into client computers (e.g., computer 600) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of generating diagnostic data. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 604 and computer data storage unit 612) having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 600). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 600) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 600) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 600), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of generating diagnostic data, the method comprising the steps of:
   in response to a determination that an error condition occurs in a first node executing a first process which restarts based on the error condition occurring, a computer receiving a first message broadcast from the first node to a second node and one or more other nodes, the second node including the computer, and the first and second nodes and the one or more other nodes included in a distributed computing system executing multiple processes;
   in response to receiving the first message, the computer starting an in-memory collection of diagnostic data in the second node, other in-memory collections of other diagnostic data being started in the first node and the one or more other nodes in response to the first message being broadcast from the first node;
   subsequent to the step of receiving the first message, the computer determining that the error condition occurs in the second node; and
   based on the error condition occurring in the second node, the computer broadcasting a second message to the first node and the one or more other nodes which causes the first node, the second node, and the one or more other nodes to perform a dump of the in-memory collection of diagnostic data and the other in-memory collections of other diagnostic data at a predefined location.

2. The method of claim 1, further comprising the step of based on the dump of the in-memory collection of diagnostic data and the other in-memory collections of other diagnostic data, the computer determining that a root cause of the error condition is based on an event at a third node in the distributed computing system, the third node being included in the one or more other nodes.

3. The method of claim 2, further comprising the step of the computer generating the diagnostic data on the second node in a synchronized manner with the other diagnostic data on the first node and the one or more other nodes, based on the collection of the diagnostic data and the other collections of the other diagnostic data being dumped in response to the step of broadcasting the second message, wherein the step of determining that the root cause is the event is based on the diagnostic data being generated in the synchronized manner with the other diagnostic data.

4. The method of claim 2, further comprising determining activities that occurred in the first node and the one or more other nodes within a time period preceding a time at which the error condition occurred in the second node, the time period being less than each of lifecycles of the respective multiple processes, wherein the step of determining that the root cause is the event is based on the activities that occurred within the time period.

5. The method of claim 1, wherein the step of starting the in-memory collection of diagnostic data includes starting at the second node an in-memory tracing which stores events associated with the second process in a memory of the computer.

6. The method of claim 1, further comprising:
   the computer receiving an indication of a maximum amount of the diagnostic data which is a limit to an amount of the diagnostic data that is stored in a memory of the computer in response to the step of starting the in-memory collection of the diagnostic data, the indication of the maximum amount being included in the first message;
   the computer determining that the in-memory collection of the diagnostic data causes the amount of the diagnostic data to exceed the maximum amount; and
   based on the amount of the diagnostic data exceeding the maximum amount, the computer discarding an oldest record of the diagnostic data stored in the memory of the computer.

7. The method of claim 1, wherein the multiple processes are written in different programming languages and running in different runtime environments utilizing different operating systems.

8. The method of claim 1, further comprising the step of:
   providing at least one support service for at least one of creating, integrating, hosting, maintaining, and deploying computer readable program code in the computer, the program code being executed by a processor of the computer to implement the steps of receiving the first message, starting the in-memory collection of diagnostic data, determining that the error condition occurs in the second node, and broadcasting the second message.

9. A computer program product for generating diagnostic data, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:
   in response to a determination that an error condition occurs in a first node executing a first process which restarts based on the error condition occurring, the computer system receiving a first message broadcast from the first node to a second node and one or more other nodes, the second node including the computer system, and the first and second nodes and the one or more other nodes included in a distributed computing system executing multiple processes;
   in response to receiving the first message, the computer system starting an in-memory collection of diagnostic data in the second node, other in-memory collections of other diagnostic data being started in the first node and the one or more other nodes in response to the first message being broadcast from the first node;
   subsequent to the step of receiving the first message, the computer system determining that the error condition occurs in the second node; and
   based on the error condition occurring in the second node, the computer system broadcasting a second message to the first node and the one or more other nodes which causes the first node, the second node, and the one or more other nodes to perform a dump of the in-memory collection of diagnostic data and the other in-memory collections of other diagnostic data at a predefined location.

10. The computer program product of claim 9, wherein the method further comprises the step of based on the dump of the in-memory collection of diagnostic data and the other in-memory collections of other diagnostic data, the computer system determining that a root cause of the error condition is based on an event at a third node in the distributed computing system, the third node being included in the one or more other nodes.

11. The computer program product of claim 10, wherein the method further comprises the step of the computer system generating the diagnostic data on the second node in a synchronized manner with the other diagnostic data on the first node and the one or more other nodes, based on the collection of the diagnostic data and the other collections of the other diagnostic data being dumped in response to the step of broadcasting the second message, wherein the step of determining that the root cause is the event is based on the diagnostic data being generated in the synchronized manner with the other diagnostic data.

12. The computer program product of claim 10, wherein the method further comprises determining activities that occurred in the first node and the one or more other nodes within a time period preceding the time at which the error condition occurred in the second node, the time period being less than each of lifecycles of the respective multiple processes, wherein the step of determining that the root cause is the event is based on the activities that occurred within the time period.

13. The computer program product of claim 9, wherein the step of starting the in-memory collection of diagnostic data includes starting at the second node an in-memory tracing which stores events associated with the second process in a memory of the computer.

14. The computer program product of claim 9, wherein the method further comprises the steps of:
    the computer system receiving an indication of a maximum amount of the diagnostic data which is a limit to an amount of the diagnostic data that is stored in a memory of the computer in response to the step of starting the in-memory collection of the diagnostic data, the indication of the maximum amount being included in the first message;
    the computer system determining that the in-memory collection of the diagnostic data causes the amount of the diagnostic data to exceed the maximum amount; and
    based on the amount of the diagnostic data exceeding the maximum amount, the computer discarding an oldest record of the diagnostic data stored in the memory of the computer.

15. The computer program product of claim 9, wherein the multiple processes are written in different programming languages and running in different runtime environments utilizing different operating systems.

16. A method of generating diagnostic data, the method comprising the steps of:
    a first computer initiating a diagnostics feature for a first process running on the first computer, the first process communicating over a computer network with a second process running on a second computer, the diagnostics feature being initiated for the second process, the first and second computers being in a client-server computing environment;
    in response to the step of initiating the diagnostics feature, the first computer storing first diagnostic data in a first memory of the first computer for the first process, second diagnostic data being stored in a second memory of the second computer for the second process;
    the first computer determining whether an event occurred, the event indicating an error condition in the first process;
    if the event occurred, prior to the first process shutting down in response to the error condition, the first computer sending a message to the second process notifying the second process about the event and storing the first diagnostic data in a first log file, the second diagnostic data being stored in a second log file by the second computer in response to a receipt of the message by the second process, or if the event did not occur, the first computer determining whether the first diagnostic data in the first memory exceeds a limit and the first computer discarding an oldest record of the first diagnostic data stored in the first memory in response to the first diagnostic data exceeding the limit;
    the first computer generating the first diagnostic data so that the first diagnostic data is synchronized with the second diagnostic data generated by the second computer; and
    the first computer determining a root cause of the error condition based on the first diagnostic data being synchronized with the second diagnostic data.

17. The method of claim 16, wherein the step of storing the first diagnostic data includes storing debug trace data for the first process or storing trace data of the computer network.

18. The method of claim 16, wherein the step of storing the first diagnostic data includes storing the first diagnostic data without utilizing a log file.

19. The method of claim 16, further comprising the steps of:
    the first computer determining that the event occurred indicating the error condition in the first process; and
    the first computer generating a first system dump of the first computer in response to the event occurring, a second system dump of the second computer also being generated in response to the event occurring, the first and second system dumps being synchronized,
    wherein the step of the first computer determining the root cause of the error condition is further based on the first and second system dumps being synchronized.

* * * * *